United States Patent [19]
Akins et al.

[11] Patent Number: 5,828,804
[45] Date of Patent: Oct. 27, 1998

[54] FIBER OPTIC CONNECTOR SYSTEM

[75] Inventors: Richard L. Akins, Wheaton; Samuel M. Marrs, Bradley; Christopher A. Paul, Bloomingdale, all of Ill.

[73] Assignee: Panduit Corp., Tinley Park, Ill.

[21] Appl. No.: 720,995

[22] Filed: Oct. 15, 1996

[51] Int. Cl.⁶ .................................................. G02B 6/38
[52] U.S. Cl. ................................................. 385/58; 385/70
[58] Field of Search ................................. 385/58, 53, 70, 385/77, 65

[56] References Cited

U.S. PATENT DOCUMENTS

| | | | |
|---|---|---|---|
| 4,240,695 | 12/1980 | Evans | 350/96.21 |
| 4,279,467 | 7/1981 | Borsuk et al. | 385/65 |
| 4,291,943 | 9/1981 | Binek et al. | 350/96.22 |
| 4,762,388 | 8/1988 | Tanaka et al. | 385/58 |
| 5,136,672 | 8/1992 | Mulholland et al. | 385/53 |
| 5,259,052 | 11/1993 | Briggs et al. | 385/78 |
| 5,481,634 | 1/1996 | Anderson et al. | 385/76 |

FOREIGN PATENT DOCUMENTS 63-118109   5/1988   Japan .

*Primary Examiner*—Phan T.H. Palmer
*Attorney, Agent, or Firm*—Mark D. Hilliard; Robert A. McCann; Michael J. Turgeon

[57] ABSTRACT

A fiber optic connector system for mating a fiber optic plug to a fiber optic jack that utilizes a springboard latch on the jack having a cam surface which mates with a recessed cam surface on the fiber optic plug to inwardly bias the plug into the jack.

4 Claims, 5 Drawing Sheets

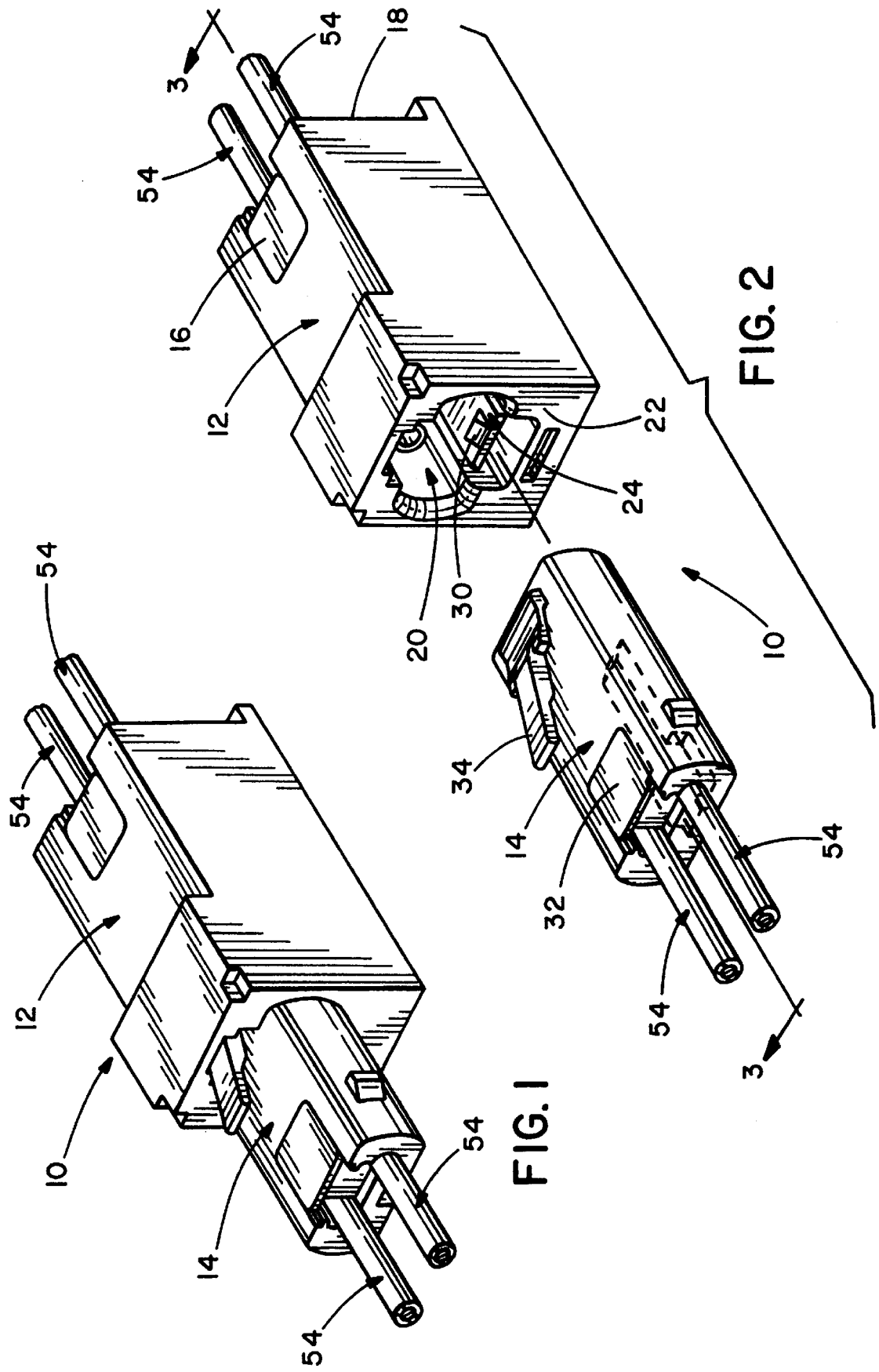

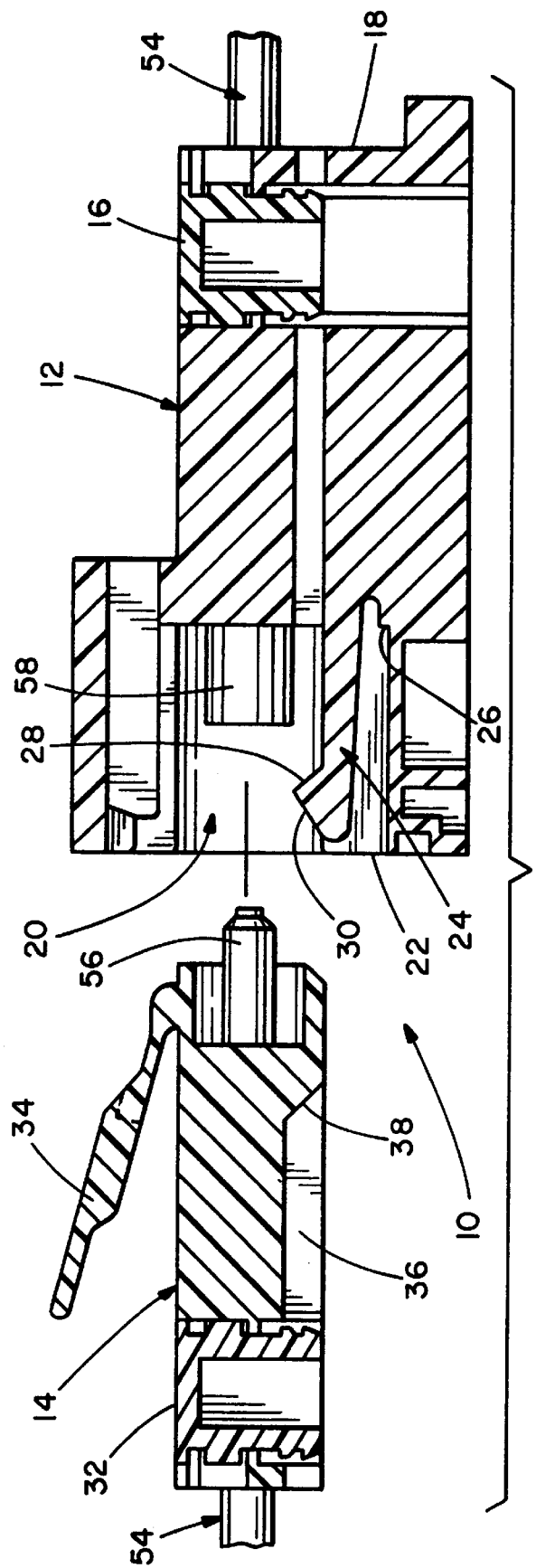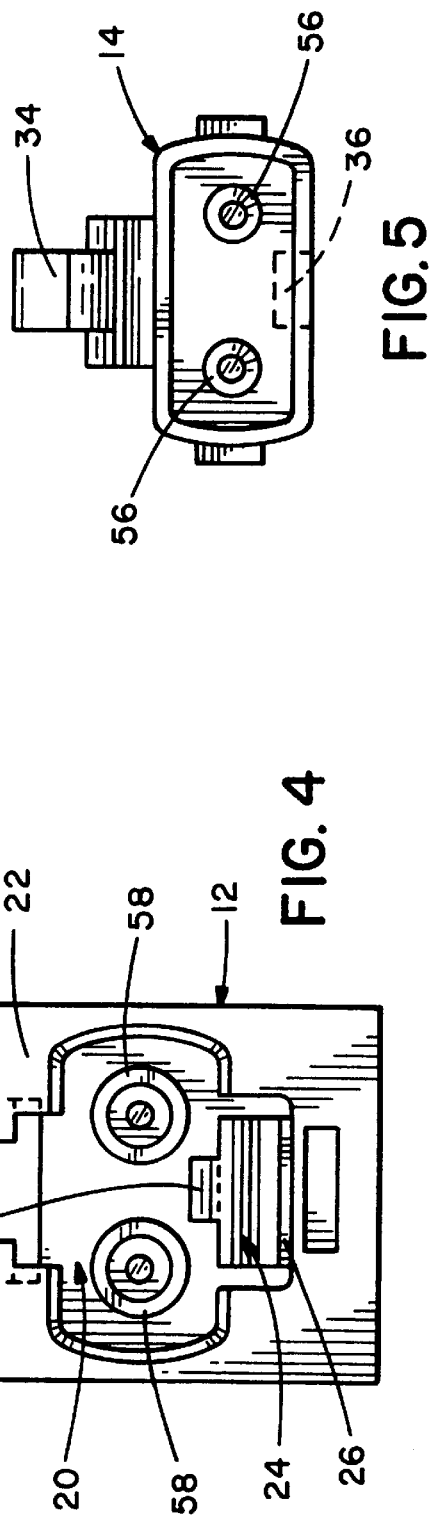
FIG. 3
FIG. 4
FIG. 5

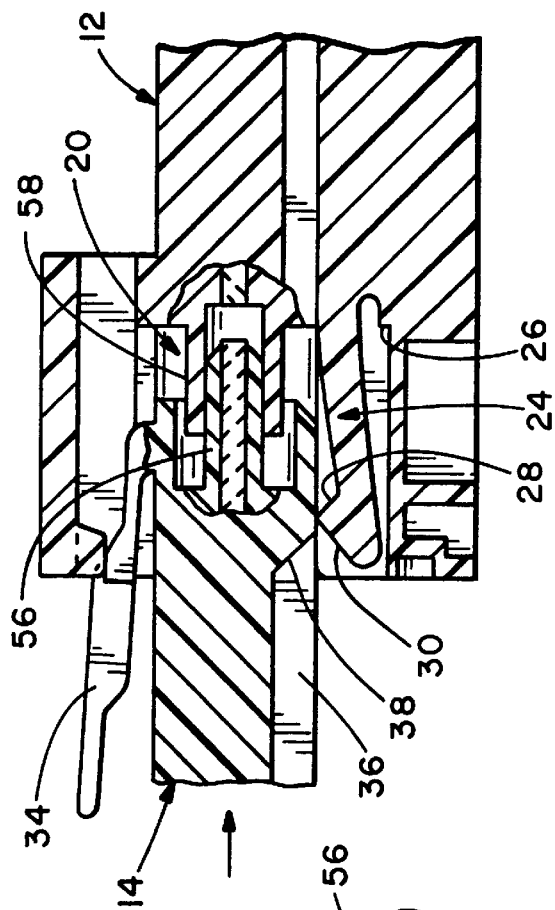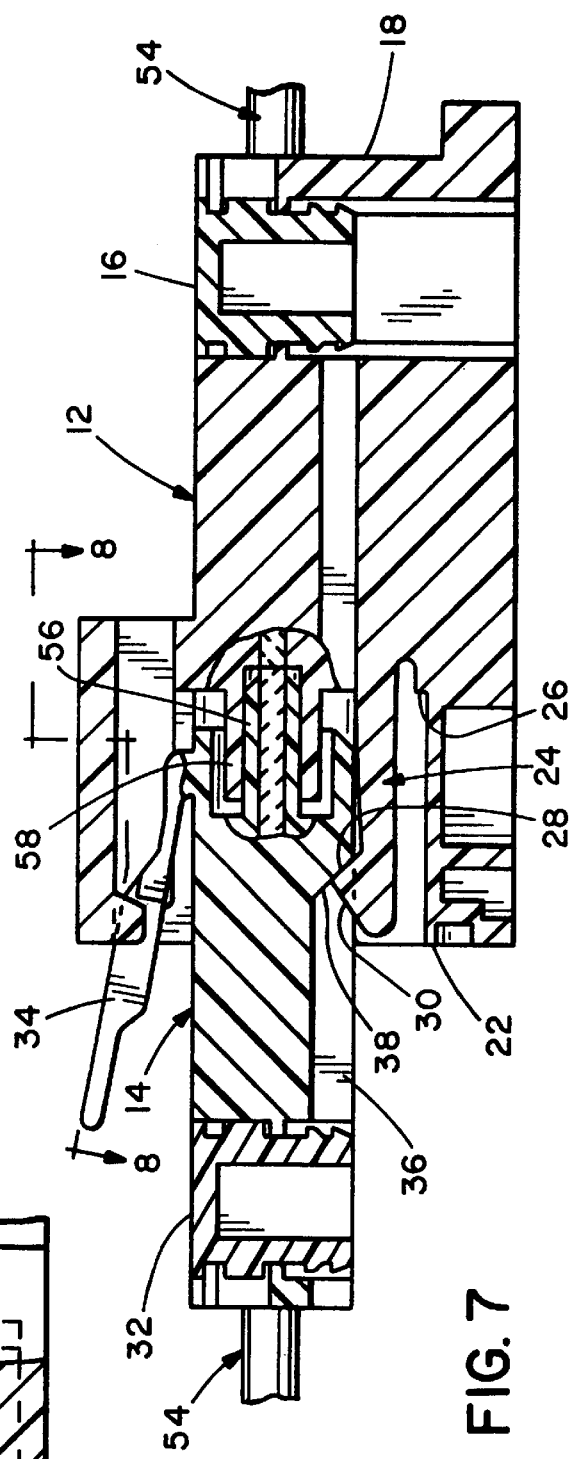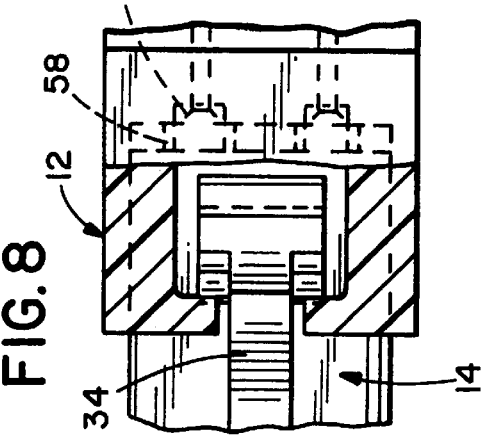

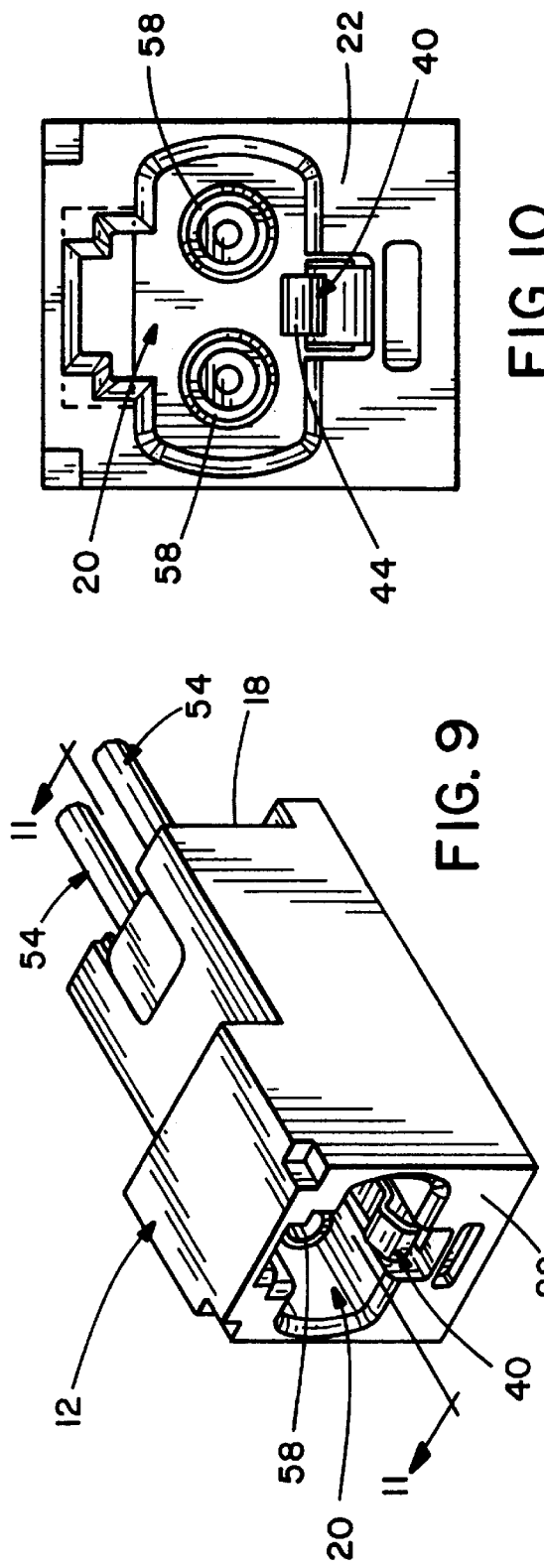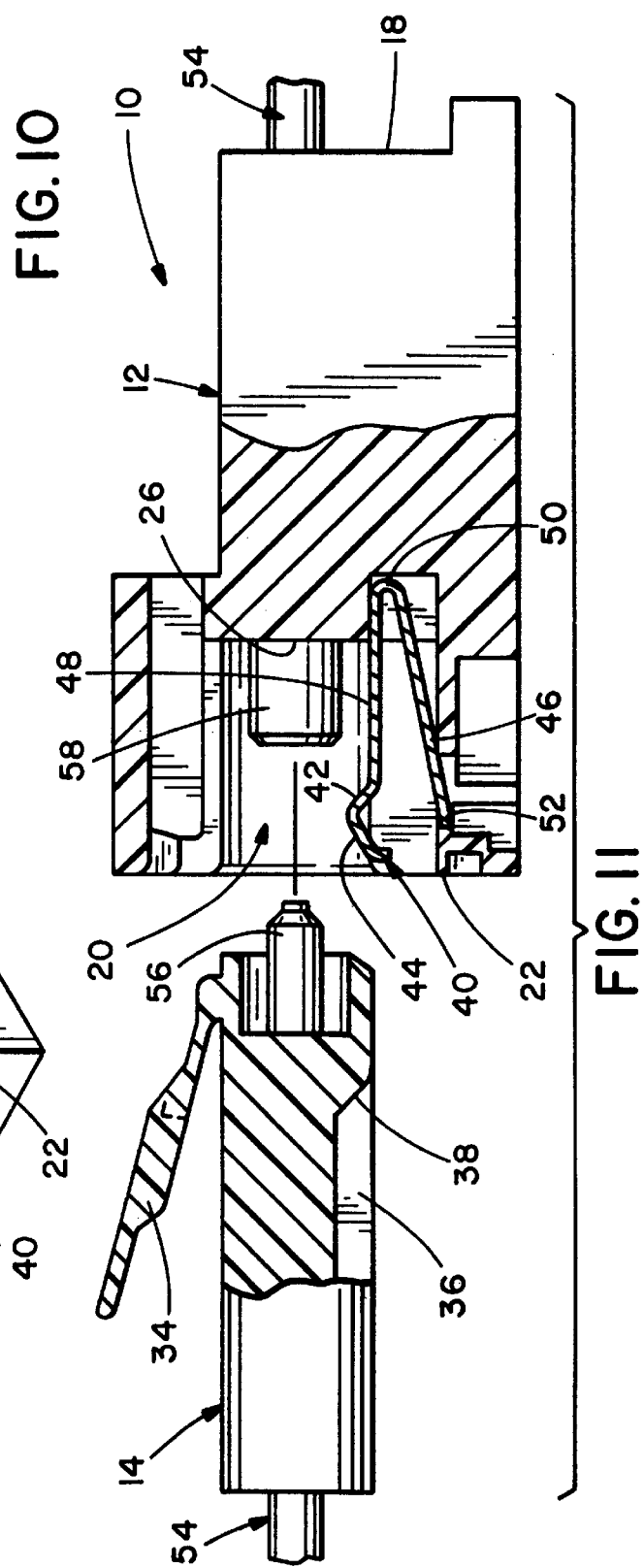

FIBER OPTIC CONNECTOR SYSTEM

TECHNICAL FIELD

The present invention relates to a fiber optic connector system and more particularly to an improved inexpensive fiber optic connector jack that includes a springboard latch design for mating with a complimentary plug to bias the fibers of the plug against the fibers of the jack.

BACKGROUND OF THE INVENTION

The use of fiber optics for transmitting information in the communications industry has become increasingly popular because of the ability for using higher data rates and avoiding electromagnetic interference problems associated with electrical conductors. All plug and jack connector systems require some form of mating arrangement in which the contacts of the plug are maintained in a contacting relationship with the contacts of the jack. Generally with standard electrical communication plugs and jacks, reversely bent conductors are disposed so as to be spring biased in relation to each other when the plug and jack are mated. However, with fiber optic cables in which there is no inherent spring characteristic in the axial direction, the industry has generally utilized more complicated and expensive spring loaded ferrule designs in order to axially bias the mating fiber optic cables of the plug and jack receptacle against each other. These designs in addition to being more expensive have more parts and require additional and more complicated assembly steps. With glass fiber systems it is particularly important to have precise alignment between fibers and to axially bias the fibers to ensure that there are no gaps. With plastic fiber systems, while it is still necessary to align and bias together fibers the same precision is not required. Therefore, in the design of both glass and plastic fiber optic connecting systems, less expensive connector designs are desired and improvement in the art of fiber optic connector designs is needed.

SUMMARY OF THE INVENTION

It is therefore, an object of the present invention to provide an improved fiber optic connector system.

It is a further object of the present invention to provide a simple and inexpensive fiber optic jack receptacle design for mating with a fiber optic plug.

It is still further an object of the present invention to provide a fiber optic jack utilizing a single springboard latch to axially bias the fibers upon mating with a plug.

In general, a fiber optic connector according to the present invention includes a plug receiving opening at a front end adapted to mate with a male plug, and a springboard disposed within the plug receiving opening and including a cam means for engaging with a complimentary surface on the plug for biasing the plug in an inward direction with respect to the jack.

BRIEF DESCRIPTION OF THE DRAWINGS

FIG. 1 is a perspective view of a fiber optic plug mated with a fiber optic jack in accordance with the fiber optic connector design of the present invention.

FIG. 2 is a perspective view of the fiber optic plug and the fiber optic jack of the fiber optic connector system shown prior to engagement.

FIG. 3 is a sectional side view of the fiber optic connector system of FIG. 2.

FIG. 4 is a front elevational view of the fiber optic jack of FIG. 2.

FIG. 5 is a front elevational view of the fiber optic plug of FIG. 2.

FIG. 6 is a side partial sectional view of the plug and jack partially engaged.

FIG. 7 is a side sectional view of the fiber optic plug and jack fully engaged.

FIG. 8 is a sectional view taken along lines 8—8 of FIG. 7.

FIG. 9 is a perspective view of a second embodiment of the fiber optic jack of the present invention.

FIG. 10 is a front elevational view of the fiber optic jack of FIG. 9.

FIG. 11 is a side sectional view of the fiber optic plug and the fiber optic jack of the second embodiment prior to engagement.

DESCRIPTION OF THE PREFERRED EMBODIMENT

Figure 12:
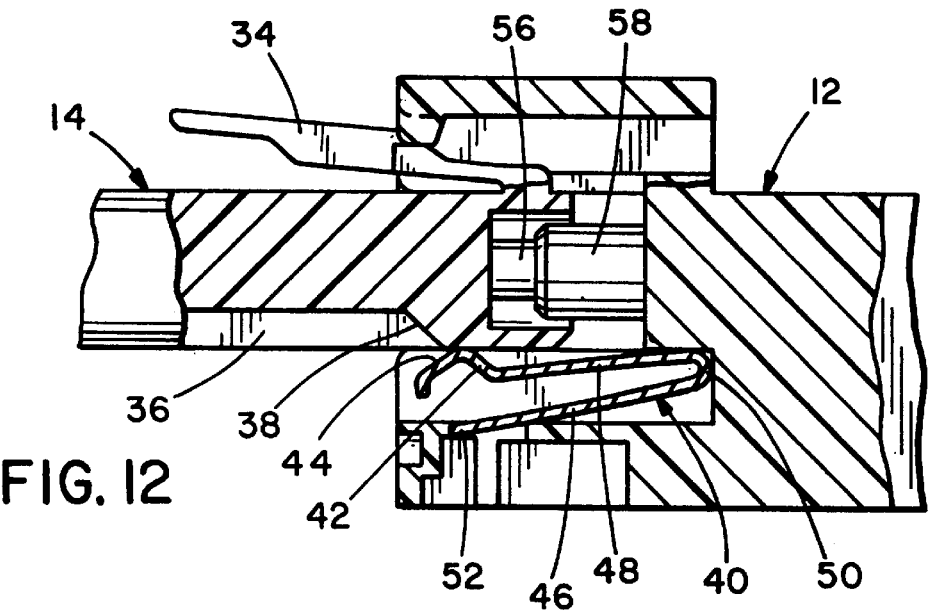
FIG. 12 is a partial side sectional view of the second embodiment partially engaged.

A fiber optic connector system embodying the concept of the present invention is designated generally by the reference numeral 10 in the accompanying drawings. As shown in FIGS. 1 and 2, the fiber optic connector system is comprised of a fiber optic plug 14 which receives and positions a pair of side-by-side fiber optic cables 54 and a fiber optic jack 12 which receives and positions a pair of side-by-side fiber optic cables 54 for mating with the corresponding fibers 54 of the plug 14.

As seen in FIGS. 3 and 4, the fiber optic jack 12 has a plug receiving opening 20 at the front end 22 and receives a pair of fiber optic cables 54 in the rear end 18 which are retained by a punch down insert 16 having teeth disposed on the lateral edges which partially cut into the fiber jacket without damaging the fiber to provide resistance against an axial load. The receptacle opening 20 includes a single cantilevered springboard 24 extending from a bottom side of a back wall 26 of the receptacle opening towards the front end 22 of the jack. The active area of the springboard 24 includes a projecting cam surface 28 which matingly corresponds with a cam surface of a recess formed on the underside of the complimentary fiber optic plug 14. The raised cam surface 28 also has a sloped front lead-in surface 30 which meets the plug 14 during insertion and causes the springboard 24 to deflect downward. The position of the single springboard at the bottom within the plug receiving opening also allows for space savings which is an important consideration in using fiber optic connectors.

As seen in FIGS. 3 and 5, the fiber optic plug 14 also includes a punchdown insert 32 which is disposed between a pair of fiber optic cables 54 and includes teeth on the lateral edges which partially cut into the fiber jacket without damaging the fiber to provide resistance against an axial load. A recess 36 is disposed on the underside of the plug and is spaced rearwardly from the front end of the plug 14. A cam surface 38 is disposed at the front end of the recess 36 and is situated so as to correspond to the cam surface 28 on the springboard 24 when the plug 14 is fully inserted into the jack 12.

As best seen in FIGS. 6 and 7, as plug 14 is inserted into the receptacle opening 20 of jack 12, the sloped lead-in surface 30 abuts against the plug 14 and deflects the cantilevered springboard 24 downward until plug 14 has been sufficiently inserted so that the springboard cam 28 engages with the cam surface 38 of the recess 36 of the plug 14. The springboard 24 and cam surfaces 28, 38 are angled such that there will be a constant spring bias directing the fibers 54 held in ferrules 56 of the plug 14 axially inward towards the jack fibers 54 positioned within alignment tubes 58 extending from the back end of the receptacle opening 20.

FIG. 8 shows the details of a standard latch mechanism 34 of the plug 14 which resiliently abuts against a top wall of the jack opening 20. This contact action of resilient latch 34 helps to counter any upward force of the single springboard 24 and maintain the horizontal alignment of the fibers 54 of the plug 14.

Figure 13:
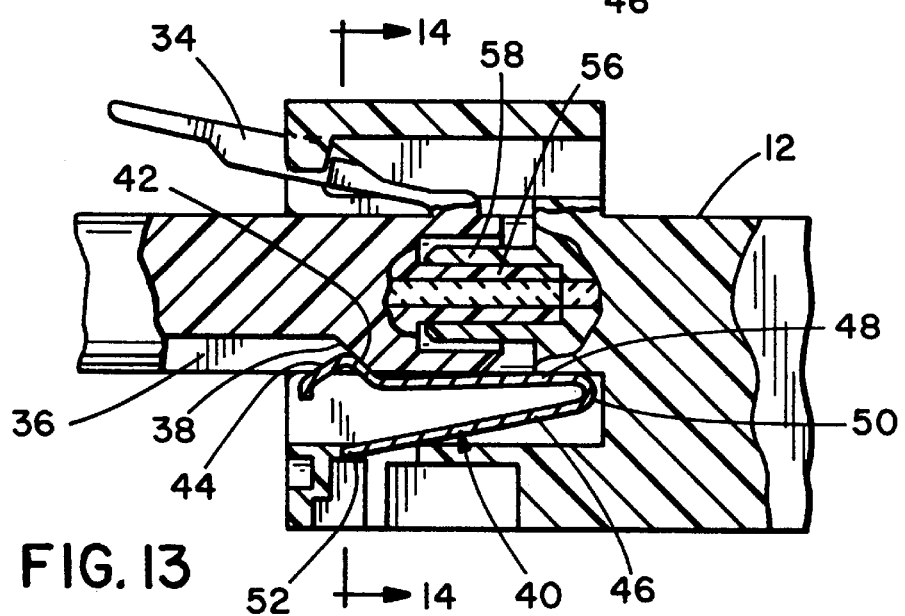
FIG. 13 is a side sectional view of the second embodiment fully engaged.
Figure 14:
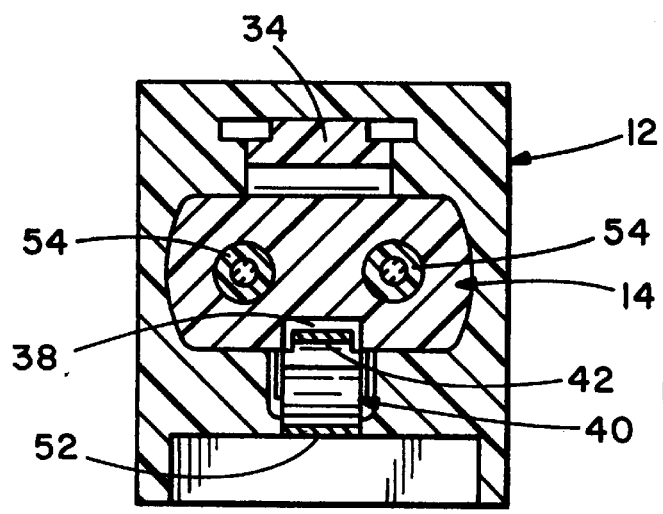
FIG. 14 is a sectional view taken along lines 14—14 of FIG. 13.

FIGS. 9–14 show a second embodiment of the present invention utilizing a metal springboard design. While other designs could be used for a metal springboard such as a cantilevered beam, as best seen in FIG. 11, the springboard 40 shown in this embodiment is a reversely bent metal spring clip which has a reversely bent mid-section 50 inserted into a recess in a lower back end of the receptacle opening 20. The metal springboard 40 includes a lower leg portion 46 having a front end which engages with a lip 52 of the receptacle, a reversely bent mid-section 50 and an upper leg portion 48 which acts as the springboard. The upper leg portion 48 has the cam surface 42 formed therein as well as the sloped lead-in surface 44. The cam surface 42 of the upper leg portion of the reverse bent spring is similarly designed to mate with the recessed cam areas 38 of the plug 14 to force the plug into a biased position with respect to the fibers so secured in the jack housing 12.

It is to be noted that while the proposed fiber optic connector system has been shown for a duplex connector that other non-duplex connector systems could also be made that follow the teachings of the present invention.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A fiber optic connector system comprising:
   a fiber optic plug including a housing surrounding a ferrule and having means for positioning a terminated end of at least one fiber optic cable towards a front end of the plug;
   a fiber optic jack having a rear end for accepting and positioning at least one fiber optic cable;
   a plug receiving opening formed at a front end of the fiber optic jack; and
   a springboard disposed in the plug receiving opening having a projecting cam surface situated so as to engage a complimentary cam surface on the fiber optic plug housing upon full insertion into the receptacle opening wherein the springboard is a reversely bent metal clip having a lower leg secured to the housing and an upper leg for mating with the plug.

2. A fiber optic connector jack with a plug receiving opening at a front end adapted to mate with a male plug comprising:
   a springboard integrally formed as a cantilever extending from a lower side of the plug receiving opening wherein the springboard includes a cam means for engaging with a complimentary surface on the plug for biasing the plug in an inward direction with respect to the jack.

3. A fiber optic connector jack according to claim 2 wherein the springboard is made of metal.

4. A fiber optic connector system comprising:
   a fiber optic plug including a housing surrounding a ferrule and having means for positioning a terminated end of at least one fiber optic cable towards a front end of the plug;
   a fiber optic jack having a rear end for accepting and positioning at least one fiber optic cable;
   a plug receiving opening formed at a front end of the fiber optic jack; and
   a springboard disposed in the plug receiving opening having a projecting cam surface situated so as to engage a recess formed on the fiber optic plug housing upon full insertion into the receptacle opening.

* * * * *